Patented Apr. 12, 1949

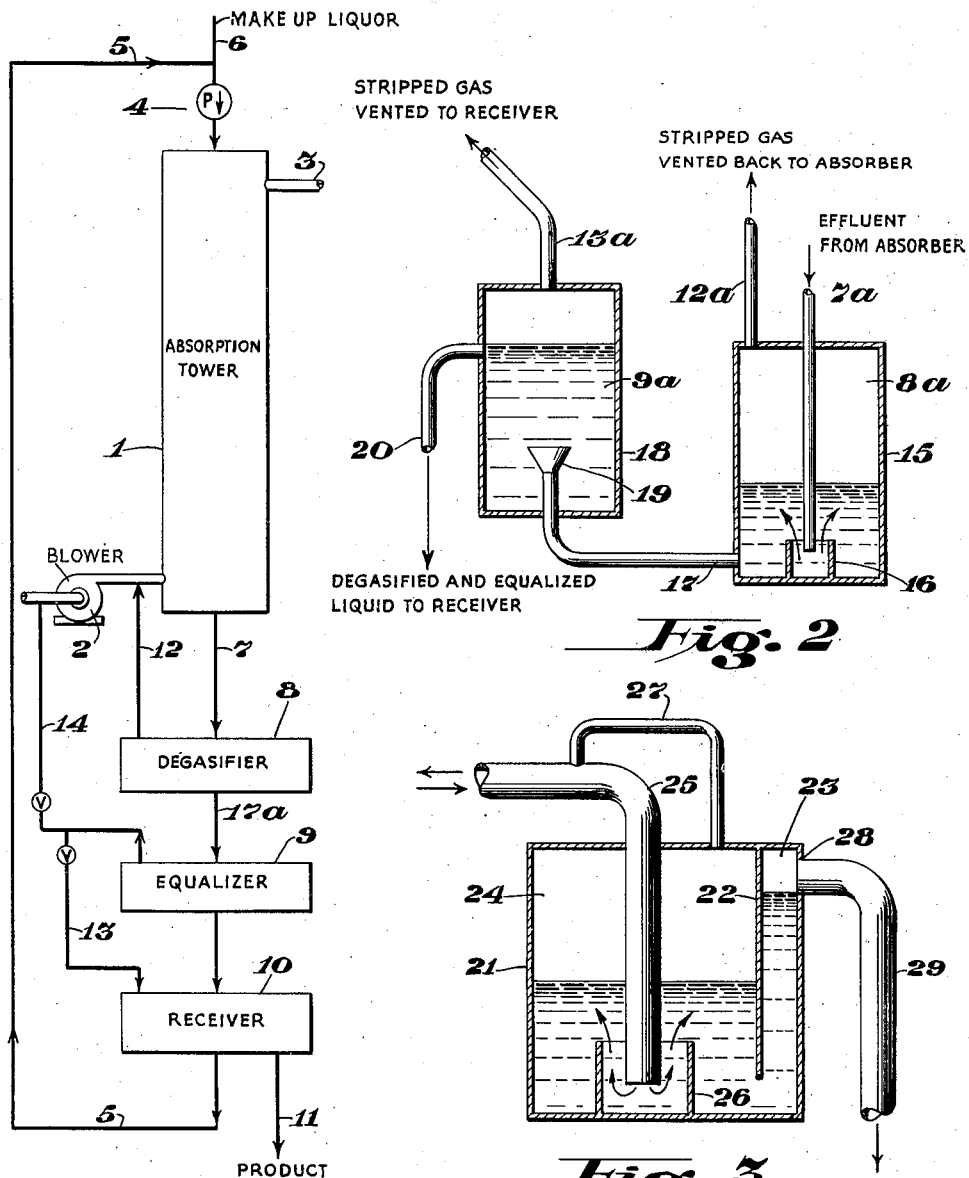

2,466,767

UNITED STATES PATENT OFFICE 2,466,767

PROCESS AND APPARATUS FOR THE PRODUCTION OF OLEUM

Carl V. Herrmann and Lee A. Myers, Wilmington, Del., assignors to E. I. du Pont de Nemours & Company, Wilmington, Del., a corporation of Delaware Application March 30, 1944, Serial No. 528,706

5 Claims. (Cl. 23—167)

This invention relates to the absorption of a gas in an absorbent liquid and is directed to improvements particularly designed to facilitate the absorption of a gas in an absorbent liquor of such character that the absorbent solution readily occludes or mechanically entrains an appreciable quantity of the gas.

In the absorption of a gas in an absorbent liquid, as, for example, the absorption of sulfur trioxide in weak oleum to produce a strong oleum, the gas is commonly scrubbed with the absorbent liquid in a suitable absorber such as an absorption tower. In the operation the gas is forced into the absorber at a pressure sufficiently above atmospheric to overcome the internal resistance of the absorber and the internal resistance of such supplementary or clean-up absorbers or other apparatus as may be included in the system. Where the absorbent liquid has high affinity for the gas being absorbed and the vapor pressure of the gas over the absorbent solution is low no difficulties are encountered in withdrawing the absorbent solution to atmospheric pressure. But we have observed that under circumstances where the opposite conditions obtain, as in the absorption of sulfur trioxide in weak oleum to produce strong oleum, losses are occasioned by entrainment or occlusion of gas in the absorbent liquid which results in gas being evolved when the pressure above the absorbent liquid is reduced to atmospheric.

We have now found that this particular difficulty encountered in absorption processes of the character described is avoided by withdrawing the absorbent solution from the absorber and while maintaining the pressure over the absorbent liquid substantially equal to the pressure in the absorber, separating from it the mechanically entrained gas, returning the thus recovered gas to the absorption and then reducing the pressure over the withdrawn solution to atmospheric.

In absorption systems of the character above described the pressure above atmospheric is very small. The pressure is needed only for the purpose of effecting movement of the gas through the system, and for this purpose it needs only to be equivalent to the internal resistance of the system. For optimum operations the pressure naturally should be as low as possible since the greater the internal resistance of the system the less is the volume of gas that can be moved through the system without increased blower capacity. Ordinarily the pressure in such systems may be measured in less than .1 or .2 of an atmosphere. Yet, in some systems this slight pressure differential is responsible for considerable loss in efficiency and it is the purpose of our invention to provide apparatus which may be interposed between the absorber, which is at superatmospheric pressure, and a receiver, which is at atmospheric pressure, which will equalize the pressure differential and at the same time return the easily stripped gas to the absorber.

The invention may be more fully understood by reference to the accompanying drawing in which Figure 1 is a flowsheet, Figure 2 is a detailed view of the degasifier and equalizer, and Figure 3 is a detailed view of a modified form of degasifier and equalizer.

Figure 1 illustrates operation of an absorption tower substantially in the manner already described. The gas to be absorbed is forced through the absorption tower 1 by means of the blower 2, and leaves through the outlet 3. Simultaneously there is fed through the tower by means of the pump 4 absorbent liquor which is composed of a mixture of product recycled through line 5 and make-up liquor passed through line 6. The absorbent solution, that is, the absorbent liquid plus the dissolved gas is withdrawn from the absorption tower by means of line 7 through the degasifier 8 and equalizer 9 into the receiver 10, whence part is recycled through line 5 and part is withdrawn through line 11 as product. In the degasifier 8 the occluded or entrained gas is freed from the absorbent solution and returned through line 12 to the absorption tower. In the equalizer 9 the pressure over the absorbent solution is reduced to atmospheric and such gas as may be evolved is vented through line 13 into receiver 10, or through line 14 to the low pressure side of blower 2. Thus in the operation of the system the gas is contacted with absorbent liquid at a pressure of above atmospheric equivalent to the internal resistance of the system. The absorbent solution, that is, the liquor withdrawn from the tower, while at substantially the same pressure is treated to separate mechanically entrained gas which is returned to the absorber and then treated to reduce the pressure to atmospheric.

The invention is particularly useful in the production of strong oleum, that is, oleum of about 40% strength. For this purpose a weak oleum, that is, any say up to 20% strength, is used as the make-up liquor, although it will be understood that a stronger oleum or sulfuric acid or any material suitable for diluting the recycled product may be used. Ordinarily only a small differential is maintained between the strength of the absorbent liquid and the absorbent solution, and the purpose of the make-up liquor is to obtain this differential. The required quantity of make-up liquor is also reflected in the quantity of product produced. The differential is therefore determined by the amount of acid or product recycled to the absorption tower. In an externally cooled absorption tower, that is, one in which the recycled product is cooled and passed through the tower in sufficient volume to effect the necessary abstraction of the heat of dilution, the volume recycled is large whereas, as in an internally cooled absorption tower, the volume recycled may be substantially smaller.

In a typical example in which the absorption tower is internally cooled and has a capacity to handle approximately 187,300 pounds of $SO_3$ in a gas of average analysis of 10-13 volume per cent at a temperature in the vicinity of 120° C., approximately a half million pounds per day of absorbent liquor is pumped to the tower of which approximately 180,000 pounds is make-up liquor of 20% oleum strength. Under these conditions there is absorbed approximately 60,000 pounds of sulfur trioxide with the production of approximately 240,000 pounds of 40% oleum.

In Figure 2 there is illustrated degasifying and equalizing apparatus particularly adapted for use in a system for absorbing sulfur trioxide as strong oleum as described above. According to the form of the invention here illustrated the effluent from the absorber, that is, the absorbent solution, is withdrawn through line 7a into the degasifier 8a. The pipe 7a leads down into the closed gas-tight receptacle 15 and terminates in the cup 16. When the absorbent solution flowing down pipe 7a reaches cup 16 direction of flow is reversed, as indicated by the arrows. In this manner the gas entrained or occluded in the effluent from the absorber is given an impetus in an upward direction. When the bubbles reach the surface of the liquid they have a tendency, therefore, to break free of the liquid and to separate therefrom. The gas thus separated is vented through line 12a back to the absorber.

The degasified solution is withdrawn through line 17 into the equalizer 9a. The outlet 17 is located in the receptacle 15 in a region free of occluded or entrained gas bubbles. The reversal of flow which is imparted to the incoming absorber effluent segregates the entrained gas bubbles into a more or less vertical column leaving the oleum in the surrounding regions relatively free of the gas bubbles. By locating the outlet 17 in this region, as, for example, as shown near the bottom of the receptacle 15, absorber effluent relatively free of occluded gas bubbles is obtained. The pipe 17 enters the equalizer 9a through the bottom of the receptacle 18 and is provided with a flared conical-shaped open end 19 for the purpose of reducing the velocity at which the absorber effluent enters the equalizer 9a. As the pressure is lessened in the passage of the absorber effluent up through the hydrostatic column defined by the vertical portion of pipe 17 and the receptacle 18 gas is liberated and the enlarged flared outlet 19 accommodates the greater volume of the gas-filled liquid thus produced. The gas bubbles here too are given an impetus upwardly in accordance with their natural tendency and so break through the surface of the liquid and are vented to the receiver through line 13a. The degasified and equalized solution is withdrawn from the container 18 through the overflow 20, which is so located with respect to the degasifier 8a that the level of liquid in the degasifier is maintained intermediate its height substantially as illustrated.

According to the modified form illustrated in Figure 3 the degasifier and equalizer are incorporated in a single receptacle 21. The partition 22 separates the receptacle 21 into low-pressure and high-pressure compartments 23 and 24. In the high-pressure compartment 24 the absorber effluent is fed in through line 25 into the cup 26 essentially as described in connection with Figure 2. The freed gas is vented through line 27 into the horizontal portion of line 25 where it returns, flowing above and countercurrent to the flow of absorber effluent therein. The partition 22 terminates short of the bottom of the container 21 to provide communication between the high-pressure and low-pressure compartments and there is provided an outlet at 28 so located as to give the desired level of liquid in the high-pressure compartment 24. The liquid in the low-pressure compartment 23 thus constitutes a hydrostatic column for equalizing the pressure between the absorber and the receiver. The degasified and equalized absorber effluent then passes through line 29 into the receiver 10. Any gas evolved in the low-pressure compartment will also follow this line into the receiver.

Either of the modifications illustrated in Figures 2 and 3 may be utilized in the system such as illustrated in Figure 1 and it will be understood that these and other variations may be resorted to without departure from the spirit and scope of the invention.

We claim:

1. In the manufacture of oleum the steps of contacting sulfur trioxide-containing gas with oleum at a pressure above atmospheric less than two-tenths of an atmosphere, withdrawing the oleum thus formed and while maintaining substantially the same temperature and pressure, separating from it the entrained gas, returning the gas thus separated to the absorption, then reducing the pressure over the withdrawn solution to atmospheric and returning to the absorption the gas evolved upon reducing the pressure.

2. In the manufacture of oleum the steps of contacting sulfur trioxide-containing gas with oleum at a pressure above atmospheric less than two-tenths of an atmosphere, withdrawing oleum containing entrained gas and passing it upwardly through a body of oleum withdrawn from the absorption at the temperature and pressure obtaining in the absorption whereby the entrained particles break free of the liquid on reaching the surface, returning the thus separated gas to the absorption, withdrawing the degassed absorbent solution through a hydrostatic column to a receiver maintained at atmospheric pressure and returning to the absorption the gas evolved from reducing the pressure.

3. In the manufacture of oleum the steps of contacting sulfur trioxide-containing gas with oleum at a pressure above atmospheric less than two-tenths of an atmosphere, withdrawing oleum containing entrained gas and passing it upwardly through a body of oleum withdrawn from the absorption at the temperature and pressure obtaining in the absorption whereby the entrained particles break free of the liquid on reaching the surface, returning the thus separated gas to the absorption, withdrawing the degassed absorbent solution and passing it upwardly through a hydrostatic column of oleum at atmospheric pressure whereby the gas evolved as a result of reducing the pressure breaks free of the liquid on reaching the surface, and returning to the absorption the gas thus evolved.

4. An apparatus for separating entrained sulfur trioxide gas from oleum under pressure and thereafter equalizing the pressure with atmospheric pressure, having in combination two gas-tight chambers, a passage connecting the lower ends of said chambers, an upwardly open cupped receiver in the first of said two chambers, a conduit entering the first chamber and terminating within the cupped receiver, a vent in the upper end of the first chamber, and an exit pipe leading from the second of said two chambers at a point substantially higher than the terminal end of the aforementioned conduit in the first chamber.

5. An apparatus for separating entrained sulfur trioxide gas from oleum under pressure and thereafter equalizing the pressure with atmospheric pressure, having in combination two gas-tight chambers, a passage between said chambers adapted to permit the unobstructed flow of liquid between the chambers, a liquid conduit entering the first of said two chambers and terminating therein within a cupped receiver adapted to impart an upward impetus to liquid leaving the conduit, a vent conduit from the upper portion of the first chamber, and an exit pipe from the second of said chambers adapted to permit the overflow of liquid from the second chamber, the exit location of said pipe in the second chamber being substantially higher than both the passage between the chambers and the terminal end of the conduit entering the first chamber.

CARL V. HERRMANN.
LEE A. MYERS.

REFERENCES CITED

The following references are of record in the file of this patent:

UNITED STATES PATENTS

| Number | Name | Date |
|---|---|---|
| 1,002,824 | Cox | Sept. 12, 1911 |
| 1,180,786 | Munzinger | Apr. 25, 1916 |
| 1,255,395 | Duram | Feb. 5, 1918 |
| 1,422,182 | Curme | July 11, 1922 |
| 1,777,025 | Allen | Sept. 30, 1930 |
| 1,942,131 | Baumann | Jan. 2, 1934 |
| 2,228,401 | Pressler | Jan. 14, 1941 |

FOREIGN PATENTS

| Number | Country | Date |
|---|---|---|
| 25,388 | Australia | Nov. 20, 1930 |
| 682,846 | Germany | Oct. 25, 1939 |